United States Patent
Fox et al.

(10) Patent No.: US 9,975,390 B2
(45) Date of Patent: May 22, 2018

(54) HEAD BEARING ARRANGEMENT FOR CONNECTING A SPRING LEG TO A VEHICLE BODY

(71) Applicant: THYSSENKRUPP BILSTEIN GMBH, Ennepetal (DE)

(72) Inventors: Carsten Fox, Dortmund (DE); Christian Noack, Köln (DE)

(73) Assignee: THYSSENKRUPP BILSTEIN GMBH, Ennepetal (DE)

( * ) Notice: Subject to any disclaimer, the term of this patent is extended or adjusted under 35 U.S.C. 154(b) by 0 days. days.

(21) Appl. No.: 14/647,293

(22) PCT Filed: Nov. 20, 2013

(86) PCT No.: PCT/EP2013/074226
§ 371 (c)(1),
(2) Date: May 26, 2015

(87) PCT Pub. No.: WO2014/082900
PCT Pub. Date: Jun. 5, 2014

(65) Prior Publication Data
US 2015/0321531 A1    Nov. 12, 2015

(30) Foreign Application Priority Data
Nov. 27, 2012  (DE) .................. 10 2012 111 471

(51) Int. Cl.
*B60G 15/06* (2006.01)
(52) U.S. Cl.
CPC ......... *B60G 15/067* (2013.01); *B60G 15/062* (2013.01); *B60G 2204/128* (2013.01);
(Continued)

(58) Field of Classification Search
CPC ................ B60G 15/067; B60G 15/068; B60G 2204/128
See application file for complete search history.

(56) References Cited

U.S. PATENT DOCUMENTS 4,531,759 A * 7/1985 Rezanka ............... B25B 13/481
188/321.11
5,000,429 A * 3/1991 Wittmar ............... B60G 15/068
267/141.3
(Continued)

FOREIGN PATENT DOCUMENTS

CN    101323235 A    12/2008
CN    101970254 A    2/2011
(Continued)

OTHER PUBLICATIONS

German Language International Search Report for International patent application No. PCT/EP2013/074226; dated Jul. 17, 2014.
(Continued)

*Primary Examiner* — Barry Gooden, Jr.
(74) *Attorney, Agent, or Firm* — thyssenkrupp North America, Inc.

(57) ABSTRACT

A head bearing arrangement for connecting a spring strut to a vehicle body includes a head bearing housing and a spring plate on which a load-bearing spring of the spring strut is supported. The spring plate is arranged on the head bearing housing. The spring plate is arranged on the head bearing housing by way of a conical seat, wherein a toothing is inserted in the conical seat between the spring plate and the head bearing housing.

8 Claims, 3 Drawing Sheets

(52) U.S. Cl.
CPC ...... *B60G 2206/41* (2013.01); *B60G 2206/71* (2013.01); *B60G 2206/7102* (2013.01)

(56) References Cited

U.S. PATENT DOCUMENTS

| | | | |
|---|---|---|---|
| 5,249,781 A | 10/1993 | Wohler | |
| 5,788,262 A | 8/1998 | Dazy et al. | |
| 6,273,407 B1 | 8/2001 | Germano | |
| 6,572,089 B2 | 6/2003 | Zietsch | |
| 7,780,177 B2 | 8/2010 | Michel | |
| 2007/0210539 A1* | 9/2007 | Hakui | B60G 15/063 280/5.514 |
| 2008/0197552 A1* | 8/2008 | Winocur | B60G 15/068 267/195 |
| 2009/0315292 A1* | 12/2009 | Winocur | B60G 15/068 280/124.146 |
| 2011/0135228 A1* | 6/2011 | Kaneko | B60G 15/068 384/420 |
| 2011/0262070 A1* | 10/2011 | Zernickel | B60G 15/068 384/618 |
| 2011/0311177 A1* | 12/2011 | Viault | B60G 15/068 384/607 |
| 2013/0195393 A1* | 8/2013 | Corbett | B60G 15/067 384/622 |
| 2016/0082800 A1* | 3/2016 | Sakairi | F16C 17/10 384/297 |
| 2016/0089946 A1* | 3/2016 | Bedeau | B60G 15/063 248/634 |
| 2016/0089947 A1* | 3/2016 | Bedeau | F16C 27/08 248/634 |
| 2016/0146253 A1* | 5/2016 | Weiss, II | F16F 9/54 188/321.11 |
| 2016/0243915 A1* | 8/2016 | Bedeau | B60G 15/068 |

FOREIGN PATENT DOCUMENTS

| | | |
|---|---|---|
| DE | 3829376 A | 3/1990 |
| DE | 4104859 C1 | 7/1992 |
| DE | 69407331 T | 4/1998 |
| DE | 20101268 U | 4/2001 |
| DE | 10051769 C1 | 11/2001 |
| EP | 0381560 A1 | 8/1990 |
| EP | 0619196 A | 10/1994 |
| EP | 1078783 A2 | 2/2001 |
| FR | 2535259 A1 | 5/1984 |
| FR | 2898170 A1 | 9/2007 |

OTHER PUBLICATIONS

English translation of International Search Report for International patent application No. PCT/EP2013/073159; dated Jul. 17, 2014.
English translation of abstract of FR 2898170 (A1).
English translation of abstract of FR 2535259 (A1).
English translation of abstract of EP 0381560 (A1).
English abstract of CN101323235A.
English machine translation of DE 20101268.

\* cited by examiner

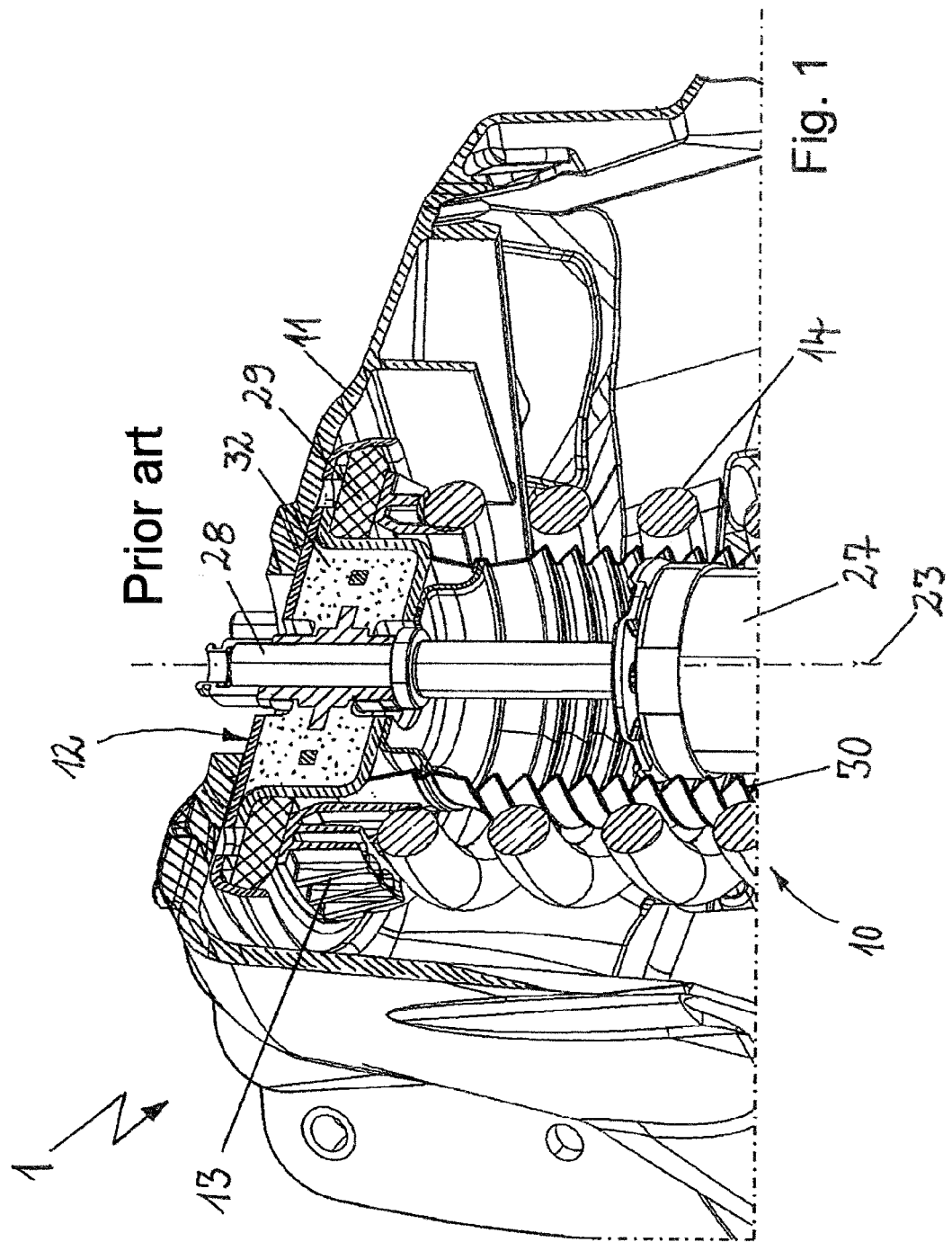

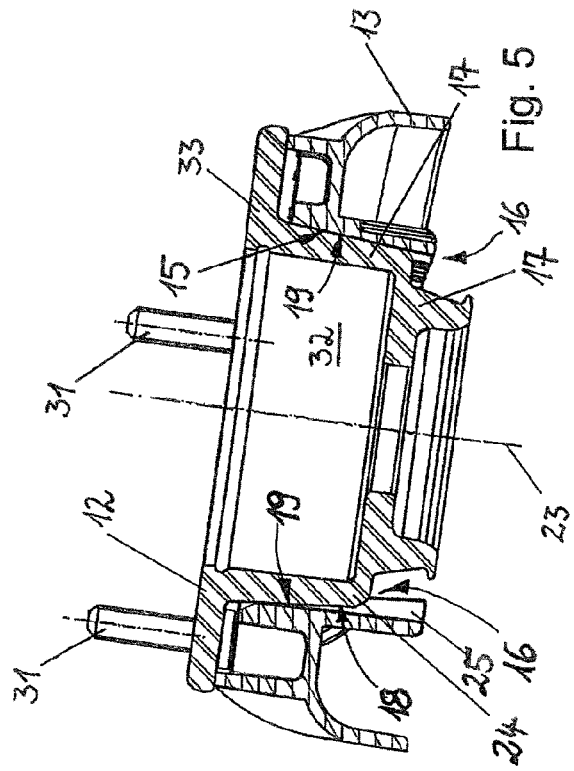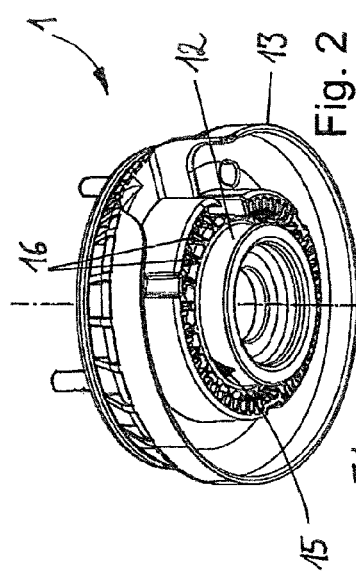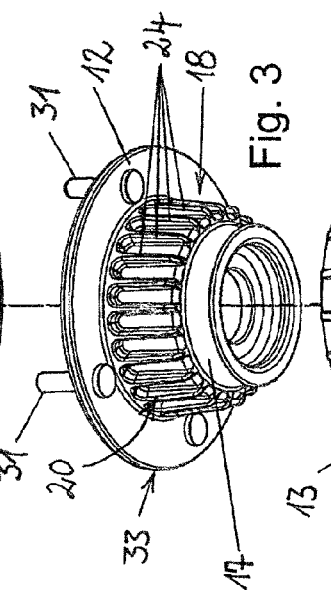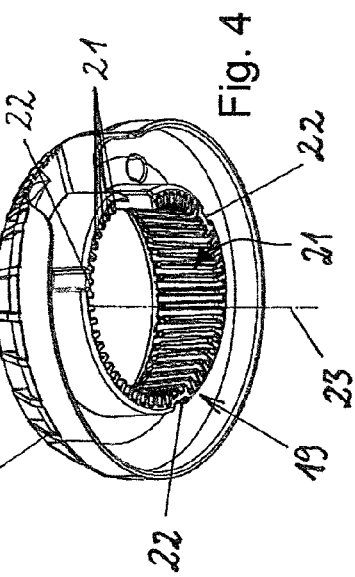

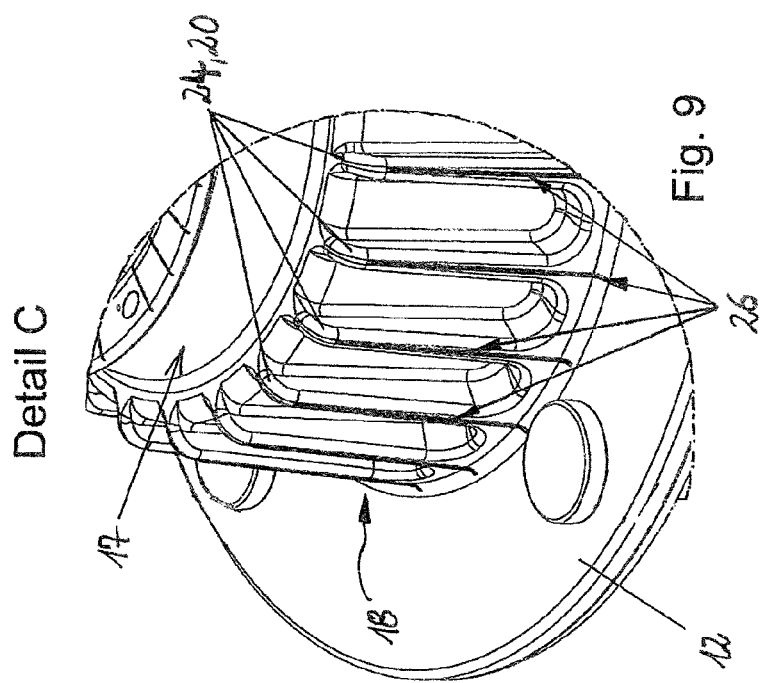
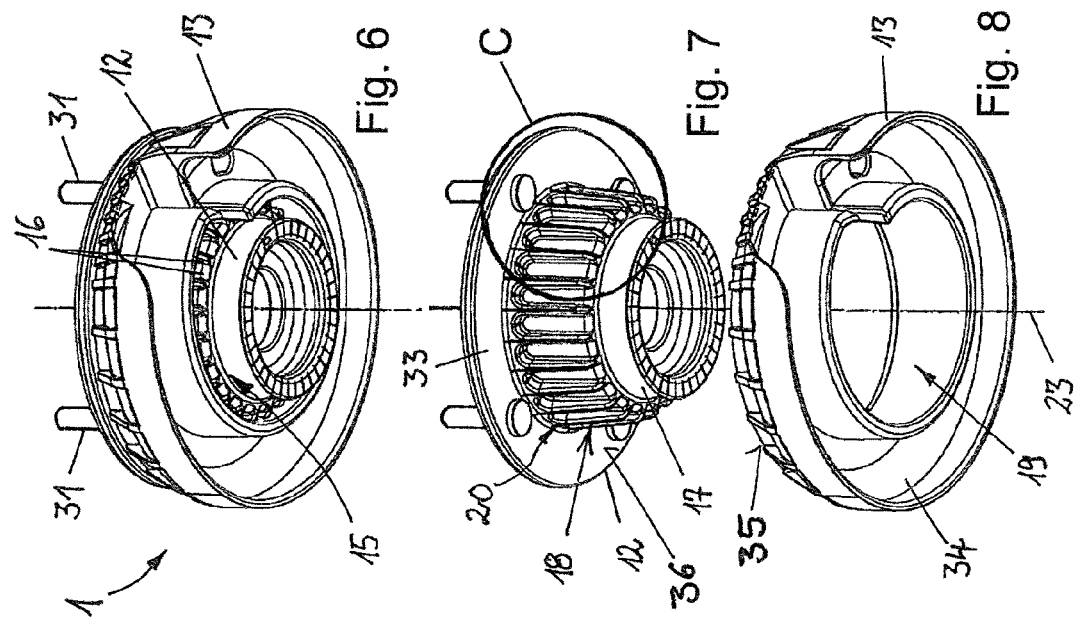

HEAD BEARING ARRANGEMENT FOR CONNECTING A SPRING LEG TO A VEHICLE BODY

CROSS REFERENCE TO RELATED APPLICATIONS

This application is a U.S. National Stage Entry of International Patent Application Serial Number PCT/EP2013/074226, filed Nov. 20, 2013, which claims priority to German Patent Application No. DE 102012111471.4 filed Nov. 27, 2012, the entire contents of both of which are incorporated herein by reference.

FIELD

The present invention relates to a head bearing arrangement for connecting a spring strut to a vehicle body, having a head bearing housing and having a spring plate on which a load-bearing spring of the spring strut is supported, and wherein the spring plate is arranged on the head bearing housing.

BACKGROUND

FIG. 1 shows a head bearing arrangement 1 for connecting a spring strut 10 to a vehicle body 11 in a known embodiment. The spring strut 10 is formed by a load-bearing spring 14 and a vibration damper 27, wherein a piston rod 28 of the vibration damper 27 is accommodated in a head bearing housing 12. The head bearing housing 12 is rigidly connected to the vehicle body 11 in a manner which is not shown in detail, wherein the figure shows the vehicle body 11 in the region of the spring dome receptacle. In order to permit a movement of the spring strut 10 in the vehicle body 11 during the operation of the motor vehicle, there is situated in the head bearing housing 12 an elastic material 32 which is normally formed by a rubber element, and the piston rod 28 is held elastically relative to the head bearing housing 12 by way of said elastic material.

The load-bearing spring 14 of the spring strut 10 is supported on a spring plate 13, and the spring plate 13 is held in supported fashion on the head bearing housing 12 by way of an elastic spring element 29. In this case, the spring plate 13 is normally formed from a plastics material, wherein, in the event of movements of the spring strut 10 in the vehicle body 11, contact noises may occur between the spring plate 13 and the head bearing housing. In particular, the flexible form of the elastic spring element 29 for supporting the spring plate 13 in the head bearing housing 12 permits a certain degree of mobility of the spring plate 13, and contact between the inner side of the spring plate 13 and that section of the head bearing housing 12 which accommodates the elastic material 32 can result in noise generation, which is perceived as a disturbance by vehicle occupants in the motor vehicle.

The compression of the load-bearing spring 14 furthermore gives rise to torques about the longitudinal axis 23, which torques are transmitted from the load-bearing spring 14 into the spring plate 13. Furthermore, use may be made of load-bearing springs 14 which have non-ground ends, whereby tilting moments can be exerted on the spring plate 13. Consequently, both the rotational moments about the longitudinal axis 23 and the tilting moments transmitted from the load-bearing spring 14 into the spring plate 13 can generate movements of the spring plate 13 relative to the head bearing housing 12, which can independently of one another contribute to noise generation and should be prevented.

BRIEF DESCRIPTION OF THE DRAWINGS

The present disclosure is described in detail below with reference to the attached drawing figures, wherein:

FIG. 1 is a transverse section view of a prior art head bearing arrangement for connecting a spring strut to a vehicle body;

FIG. 2 is a perspective view of an embodiment of a head bearing arrangement of the present disclosure having a head bearing housing and a spring plate;

FIG. 3 is perspective view of an embodiment of the head bearing housing of FIG. 2;

FIG. 4 is a perspective view of an embodiment of the spring plate of FIG. 2;

FIG. 5 is a side cross sectional view of the head bearing arrangement of FIG. 2.

FIG. 6 is perspective view of an alternate exemplary embodiment of a head bearing arrangement of the present disclosure having a head bearing housing and a spring plate;

FIG. 7 is a perspective view of an embodiment of the head bearing housing of FIG. 6;

FIG. 8 is a perspective view of an embodiment of the spring plate of FIG. 6;

FIG. 9 is a detail view C of the head bearing housing of FIG. 7.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

It is an object of the invention to provide a head bearing arrangement for connecting a spring strut to a vehicle body, which head bearing arrangement is of simple construction and generates no noises during the operation of the vehicle.

Taking a head bearing arrangement for connecting a spring strut as per the preamble of claim 1 as a starting point, said object is achieved in conjunction with the characterizing features. Advantageous refinements of the invention are specified in the dependent claims.

The invention encompasses the technical teaching that the spring plate is arranged on the head bearing housing by way of a conical seat, wherein a toothing is inserted in the conical seat between the spring plate and the head bearing housing.

Here, the invention is based on the concept of arranging the spring plate directly on the head bearing housing. In this case, the elastic spring element, which conventionally is intended to serve for noise reduction, can be dispensed with, but according to the invention, movements in the spring plate relative to the head bearing housing can be prevented simply by virtue of the spring plate being arranged on the head bearing housing by way of a conical seat. To ensure a reliable transmission of forces and moments between the spring plate and the head bearing housing, a toothing is situated in the conical seat between the spring plate and the head bearing housing. Consequently, the connection of the spring plate to the head bearing housing in the direction of the longitudinal axis is formed by frictional locking generated by the conical seat, and a rotation of the spring plate on the head bearing housing is realized by way of a form fit produced by the toothing in the conical seat. This results in a mechanically highly loadable, rigid connection between the spring plate and the head bearing housing, such that even after a long period of operation of the vehicle, no movement occurs between the spring plate and the head bearing housing, and such that the head bearing arrangement consequently also does not generate any noise. Here, use is made primarily of the effect that, even in the event of flaring of the spring plate or in the event of a change in the surface of the conical seat, play-free hold of the spring plate on the head bearing housing is always ensured, as the load-bearing spring, which presses against the spring plate, of the spring strut thus repositions said spring plate against the conical section.

The head bearing housing may then be of pot-shaped or-cup shaped form with a slightly conical outer shell, so that the elastic material for receiving the piston rod is accommodated in the inner region of the pot-shaped head bearing housing. Owing to the pot-shaped form of at least one part of the head bearing housing, a conical section can be formed which consequently has a conical external surface. The spring plate can be mounted on said conical external surface, which spring plate may, for arrangement on the conical external surface, have a conical receptacle of corresponding form to the conical external surface. By means of said conical seat thus formed, the spring plate can be mounted with its conical receptacle in clamped fashion on the conical section of the head bearing housing. Here, the toothing may be situated between the conical section and the conical receptacle. The cone angle of the conical receptacle and the cone angle of the angle, which is identical to the conical receptacle, of the conical section may be configured such that the spring plate can be seated with its the conical receptacle in self-retaining fashion on the conical section of the head bearing housing.

For example, a toothed structure may be inserted on the conical external surface of the head bearing housing. Alternatively or in addition, there may be inserted internally in the conical receptacle a toothed structure which is of corresponding form to the toothed structure on the conical external surface. The toothed structure may be composed of a multiplicity of teeth which are oriented longitudinally in the direction of the longitudinal axis and which extend over the conical section and/or the conical receptacle. Consequently, the spring plate can be mounted on the conical section of the head bearing housing in the direction of the longitudinal axis such that the teeth of the toothed structure in the conical receptacle pass into the tooth spaces of the teeth on the conical external surface of the head bearing housing. In particular, in this way, a form fit is generated in the direction of rotation of the spring plate on the head bearing housing, such that torques transmitted to the spring plate by the compressing load-bearing spring can be transmitted directly into the head bearing housing, without a rotation of the spring plate on the head bearing housing being caused.

In a further possible embodiment, the toothing between the spring plate and the head bearing housing may have load-bearing regions formed so as to be distributed over the circumference. By way of load-bearing regions formed so as to be distributed over the circumference, an alternative to a load-bearing region over the full circumference can be realized, and the toothing may be provided on the conical external surface and/or in the conical receptacle over the full circumference or in discrete regions.

For example, the toothing between the spring plate and the head bearing housing may have load-bearing regions formed so as to be distributed over the circumference. When the spring plate is mounted on the head bearing housing, the conical receptacle on the spring plate comes to lie on the conical external surface of the head bearing housing only in the load-bearing regions. In this way, defined load-bearing regions for support in an axial direction are formed, and it is for example possible for three load-bearing regions which are formed so as to be distributed at uniform angular intervals over the circumference to be provided between the spring plate and the head bearing housing. In particular, it is also possible for the toothing between the spring plate and the head bearing housing to be restricted to the load-bearing regions, or the load-bearing regions serve for the axial support of the conical receptacle on the conical external surface, so as to form, for the transmission of axial forces in the direction of the longitudinal axis, force transmission paths which are restricted to the load-bearing regions, wherein, in the event of a toothing extending over the full circumference, the form fit between the spring plate and the head bearing housing may be formed over the entire circumference. In particular, it is possible for the head bearing housing and the spring plate to extend around a longitudinal axis of the spring strut, wherein the toothing between the head bearing housing and the spring plate is formed either in partial circumferential regions or preferably over the full circumference.

In a further advantageous embodiment of the head bearing arrangement, it is possible for the contact between the conical receptacle and the conical external surface to be realized by way of tooth flanks formed on the teeth of the toothed structures. In this way, a particularly rigid form fit between the conical receptacle and the conical external surface is realized, which is in particular free from play, as the teeth engage into one another with wedge action by way of their tooth flanks. Here, the teeth of the conical receptacle are situated in a meshing arrangement with the teeth of the conical external surface. Since the teeth support one another by way of their lateral tooth flanks, particularly high contact pressures are generated at the contact points between the teeth. Alternatively, the teeth may bear load by way of their tooth tips, and may extend as far as the surface of the conical receptacle or as far as the conical external surface, such that only parts of the teeth, or all of the teeth, by way of their tooth tips.

A particularly advantageous embodiment of the head bearing arrangement comprises a head bearing housing formed from a metallic material, for example from aluminum, and the spring plate may advantageously be formed from a plastics material. In particular in the case of a material pairing of said type, it may be provided that the teeth of the toothed structure on the conical external surface of the conical section have cutting edges which at least partially cut into the conical receptacle of the spring plate during the mounting of the spring plate on the conical section. Thus, it may be provided that the spring plate is formed with a conical receptacle which initially has no toothed structure, and it is only during the mounting of the spring plate on the head bearing housing that the cutting edges of the teeth on the conical external surface of the head bearing housing cut into the surface of the conical receptacle in the spring plate. The cutting-in of the cutting edges causes a form fit to likewise be realized in the rotational direction of the spring plate on the conical section, as the cutting of the cutting edges into the material of the spring plate gives rise to notches which encompass the teeth on the conical external surface of the conical section in the form-fitting manner at least in the tip region of the teeth.

FIG. 1 shows a head bearing arrangement as per the prior art, and reference is made to the introductory part of the description.

FIGS. 2, 3 and 4 show a first exemplary embodiment of a head bearing arrangement 1 for connecting a spring strut to a vehicle body, as has already been described in conjunction with FIG. 1. Here, FIG. 2 shows the spring plate 13 in an arrangement in which it has been mounted on a head bearing housing 12, FIG. 3 shows the head bearing housing 12 in a perspective view, and FIG. 4 shows the spring plate 13 in a perspective view. The head bearing housing 12 and the spring plate 13 extend jointly around a longitudinal axis 23, which simultaneously corresponds to the longitudinal axis of the spring strut that can be received in the vehicle body by way of the head bearing arrangement 1.

FIG. 2 shows the connection between the head bearing housing 12 and the spring plate 13 by way of a conical seat 15, and in the conical seat 15, a toothing 16 is inserted between the spring plate 13 and the head bearing housing 12. In this case, the spring plate 13 has been mounted on the head bearing housing 12 in the direction of the longitudinal axis 23, such that the toothing 16 between the head bearing housing 12 and the spring plate 13 is engaged with a form fit. The design of the toothing 16 will be described in more detail below in conjunction with FIGS. 3 and 4.

FIG. 3 shows the head bearing housing 12 in a perspective view, and on the head bearing housing 12 there are arranged multiple connecting bolts 31 by means of which the head bearing housing 12 can be rigidly received in the vehicle body, in particular in the spring dome. For example, threaded nuts may be screwed onto the connecting bolts 31. In order for the head bearing housing 12 to be mounted substantially flat against the inner side in the spring dome, said head bearing housing has a plate-shaped substructure 33, on which there is situated a conical section 17, and in the conical section 17 there may be accommodated an elastic material by means of which the piston rod of the vibration damper of the spring strut can be received elastically in the head bearing housing 12.

The conical section 17 has a conical external surface 18, and a toothed structure 20 is formed on the conical external surface 18. The teeth 24 of the toothed structure 20 extend on the conical section 17 approximately parallel to the longitudinal axis 23. In this case, the conical section 17 has a slightly smaller diameter at the end than at the side of the plate-shaped substructure 33. Consequently, the spring plate 13 shown in FIG. 4 can be mounted by way of its conical receptacle 19 onto the conical section 17 in the direction of the longitudinal axis 23, such that self-retaining, frictionally locking contact can be generated between the conical external surface 18 of the head bearing housing 12 and the conical receptacle 19 of the spring plate 13.

FIG. 4 shows the spring plate 13 in a perspective view, wherein said spring plate has, running around the longitudinal axis 23, an approximately U-shaped cross section in which the load-bearing spring of the spring strut can be received. At the inside, in the direction of the longitudinal axis 23, the U-shaped cross section is delimited by a conical receptacle 19, and on the inner side of the conical receptacle 19 there is situated a further toothed structure 21, which is of corresponding design to the toothed structure 20 on the conical external surface 18 of the head bearing housing 12. When the spring plate 13 is mounted on the conical section 17 of the head bearing housing 12, a force-fitting seat of the spring plate 13 on the head bearing housing 12 can be formed in the direction of the longitudinal axis 23, whereby a clamping action between the spring plate 13 and the head bearing housing 12 is realized.

Furthermore, by way of the intermeshing teeth 24 and 25 of the toothed structure 20 on the outside of the conical section 17 and of the toothed structure 21 on the inside in the conical receptacle 19, a form fit is realized which serves in particular to prevent a rotation of the spring plate 13 on the head bearing housing 12.

FIG. 5 shows a cross-sectional view through the head bearing arrangement 1 as per FIG. 2, which extends around the longitudinal axis 23. The head bearing housing 12 may be formed as a die cast metal part, whereas the spring plate 13 may be produced from a plastics material. The connecting bolts 31 are arranged on the plate-shaped substructure 33, and the conical section 17 for receiving the spring plate 13 is situated on that side of the plate-shaped substructure 33 which is situated opposite the arrangement of connecting bolts 31. Here, the figure shows the receiving space for receiving an elastic material 32 by means of which the piston rod of the vibration damper of the spring strut can be received in the head bearing housing 12.

The toothing 16 between the conical external surface 18 and the conical receptacle 19 is situated in the region of the conical seat 15 between the spring plate 13 and the head bearing housing 12, wherein, by way of example, on the left-hand side of the longitudinal axis 23, a tooth 24 on the conical external surface 18 partially obscures a tooth 25 in the conical receptacle 19, from which it emerges that the teeth 24 and 25 engage into one another with a form fit in the circumferential direction.

On the right-hand side of the longitudinal axis 23, there is an area of contact between the conical section 17 and the conical receptacle 19 in the section plane, from which it emerges that there is force-fitting contact between the conical section 17 and the conical receptacle 19 in the direction of the longitudinal axis 23.

FIGS. 6, 7 and 8 show a further exemplary embodiment of a head bearing arrangement 1 with a head bearing housing 12 and with a spring plate 13, wherein the head bearing arrangement 1 is illustrated in an assembled arrangement in FIG. 6, and FIG. 7 shows the head bearing housing 12 on its own, and FIG. 8 shows the spring plate 13 on its own, in each case in a perspective view. The head bearing arrangement 1, the head bearing housing 12 and the spring plate 13 have in each case a common longitudinal axis 23 in FIGS. 6, 7 and 8.

The head bearing arrangement 1 shown in FIG. 6 shows the head bearing housing 12 with the connecting bolts 31 mounted thereon, and the spring plate 13 is arranged on the head bearing housing 12 by way of a conical seat 15. The conical seat 15 has a toothing 16 which will be described more detail in conjunction with the following figures.

FIG. 7 shows the head bearing housing 12 with the conical external surface 18 on the conical section 17, on which conical external surface there is provided a toothed structure 20. The detail C is illustrated in more detail in FIG. 9.

FIG. 9 shows a detail of the head bearing housing 12 according to the second exemplary embodiment. Teeth 24 for forming the toothed structure 20 are provided on the conical external surface 18 of the conical section 17. The teeth 24 have cutting edges 26 on their face sides, and the cutting edges 26 can cut into the conical receptacle 19 on the inside in the spring plate 13 during mounting of the spring plate 13 on the conical section 17. In this case, a minimum joining force between the spring plate 13 and the head bearing housing 12 in the direction of the longitudinal axis 23 is necessary in order that the cutting edges 26 on the teeth 24 of the toothed structure 20 cut into the material of the conical receptacle 19 of the spring plate 13.

FIG. 8 shows the spring plate 13 for the further exemplary embodiment, and no further toothed structure is inserted in the conical receptacle 19. The material of the spring plate 13 is designed to be softer than the material of the head bearing housing 12, and when the load-bearing spring of the spring strut is seated in the spring receptacle 34 of the spring plate 34, the spring plate 13 continues to be forced against the head bearing housing 12 in the direction of the longitudinal axis 23 even during the subsequent operation of the head bearing arrangement 1, such that it is also possible for the cutting edges 26 to work their way deeper into the conical receptacle 19 over the service life.

Here, the conical seat 15 between the spring plate 13 and the head bearing housing 12 is configured such that the top side 35 of the spring plate 13 does not make contact with the bottom side 36 of the plate-shaped substructure 33 of the head bearing housing 12, and a gap remains between the top side 35 and the bottom side 36. Only in this way is it achieved that the spring plate 13 on the conical section 17 of the head bearing housing 12 cannot loosen even after a relatively long period of operation of the head bearing arrangement 1 as a result of the use of the vehicle.

The invention is not restricted in terms of its embodiment to the preferred exemplary embodiment specified above. Rather, a number of variants are conceivable which make use of the presented solution even in fundamentally different embodiments. All of the features and/or advantages which emerge from the claims, the description or the drawings, including structural details or spatial arrangements, may be essential to the invention both individually and in a wide variety of combinations.

What is claimed is:

1. A head bearing arrangement for connecting a spring strut to a vehicle body, comprising:
   a head bearing housing having,
      a conical section protruding therefrom and defining a conical external surface, and
      a first toothed structure having a plurality of longitudinal teeth disposed on said conical external surface; and
   a spring plate having a conical receptacle defined therein, which said spring plate is disposed on said head bearing housing by way of said conical receptacle being seated about said conical external surface of said conical section of said head bearing housing, so as to define a conical seat between said head bearing housing and said spring plate, said first toothed structure being disposed in said conical seat between said spring plate and said head bearing housing, said spring plate being configured to support a load-bearing spring thereon.

2. The head bearing arrangement of claim 1, wherein said first toothed structure extends either about an entire circumference of said conical seat, or in a plurality of partial circumferential regions about the circumference of said conical seat.

3. The head bearing arrangement of claim 1, wherein said head bearing housing is made of a metallic material, and wherein said spring plate is made from a plastic material.

4. The head bearing arrangement of claim 1, wherein said spring plate further comprises a second toothed structure having a plurality of longitudinal teeth that are disposed on said conical receptacle, which said second toothed structure meshes with and is complementary to said first toothed structure of said head bearing housing.

5. The head bearing arrangement of claim 4, wherein said first toothed structure and said second toothed structure each define a plurality of tooth flanks disposed on lateral portions thereof, and wherein contact between said conical receptacle and said conical external surface is achieved by contact between said tooth flanks of said first toothed structure and said second toothed structure.

6. The head bearing arrangement of claim 4, wherein said plurality of teeth of said first toothed structure of said head bearing housing define cutting edges that are configured to at least partially cut into said conical receptacle of said spring plate during a mounting of said spring plate onto said conical section of said head bearing housing.

7. The head bearing arrangement of claim 1, wherein said first toothed structure includes at least one load bearing region defined therein and distributed over a circumference of said first toothed structure.

8. The head bearing arrangement of claim 7, wherein said first toothed structure includes three load-bearing regions defined therein that are distributed at uniform angular intervals over the circumference of said first toothed structure.

* * * * *